April 6, 1971 K. D. MEISER 3,573,923
DIELECTRIC HEATING OF FOOD
Filed June 18, 1968
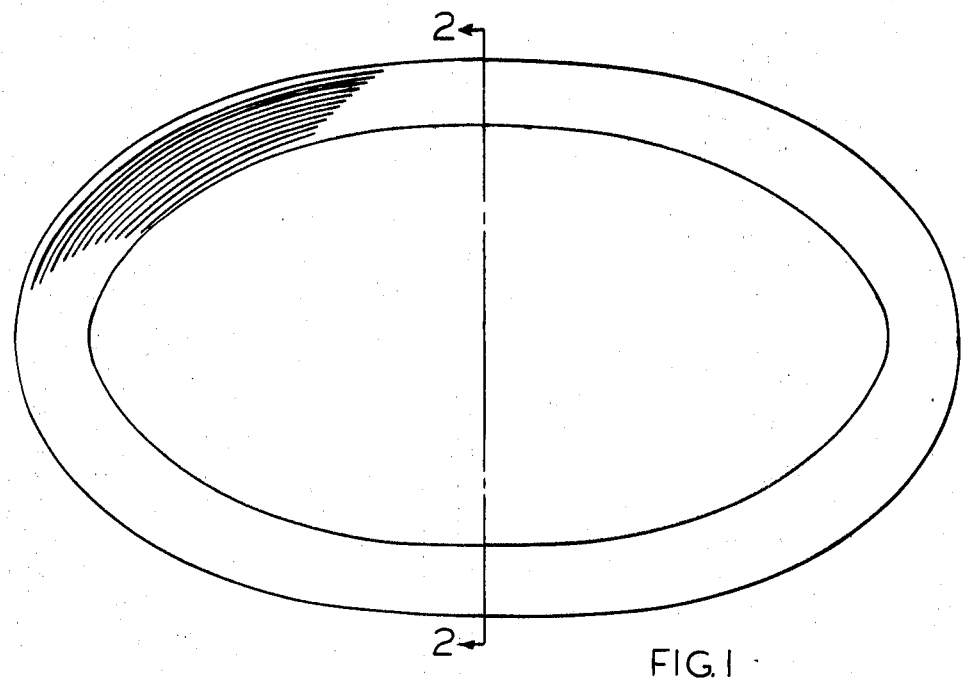
FIG. I
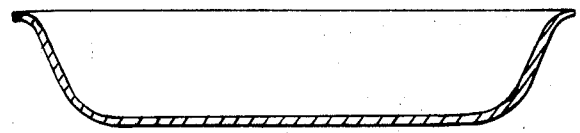
FIG. 2
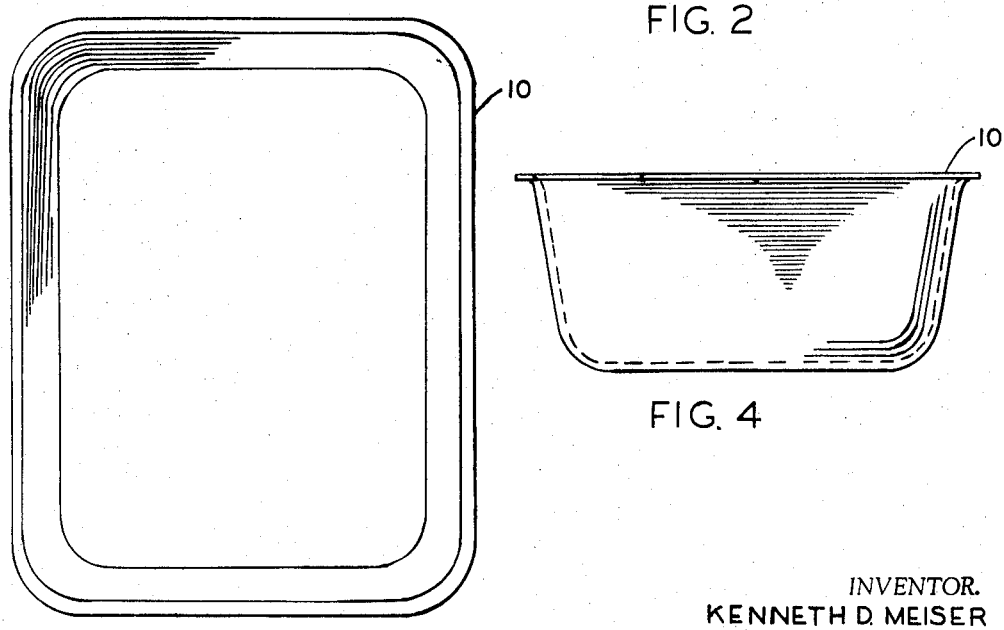
FIG. 3
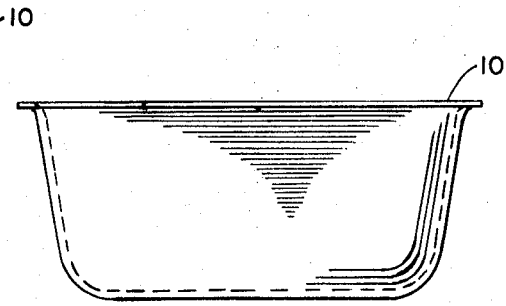
FIG. 4
INVENTOR.
KENNETH D. MEISER
BY
Marshall & Yeasting
attorneys United States Patent Office 3,573,923
Patented Apr. 6, 1971

3,573,923
DIELECTRIC HEATING OF FOOD
Kenneth D. Meiser, Dallas, Tex., assignor to Plastics Mfg. Co., Dallas, Tex.
Filed June 18, 1968, Ser. No. 737,924
Int. Cl. B65d 81/34
U.S. Cl. 99—1                                    6 Claims

ABSTRACT OF THE DISCLOSURE

A method of preparing food in which the food is placed in a recptacle consisting essentially of a cellulose-filled thermoset aminoplast and having a wall thickness from .015 to .05 inch, and is then exposed to dielectric heating which would char the receptacle if empty.

BACKGROUND OF THE INVENTION

The invention relates to the preparation of food by dielectric heating, and more particularly to the provision of a receptacle which is suitable for holding food while it is frozen, stored in frozen condition and then reconstituted by dielectric heating, and which is not liable to become damaged during the dielectric heating operation.

Dielectric heating is commonly used in restaurants to prepare food for serving. The saving in time which is made possible by dielectric heating reduces costs in restaurant operation and increases the number of customers that can be served.

A common procedure consists in preparing a particular type of food in relatively large quantities, placing individual servings of the food in separate receptacles such as small casseroles, freezing the indivdual servings for storage until needed, and removing each of the individual frozen servings from storage and heating it in a dielectric oven to the proper temperature for serving to a customer. This procedure is highly advantageous because it makes it possible to prepare a relatively large quantity of each type of food under carefully controlled conditions. Then the individual servings, after freezing, are available for use over an extended period of time. In this way it is possible to prepare the food economically, while maintaining high standards of quality. Thus in a conventional chain restaurant operation it is advantageous to prepare the food at a central commissary, under the supervision of highly skilled cooks, and to distribute the individual frozen servings tho the various restaurant locations, where dielectric heating can be used by relatively unskilled personnel to prepare the food for serving.

One of the principal problems that is encountered in any method of food preparation in which dielectric heating is employed is the problem of providing a suitable receptacle for holding the food during such heating. The receptacle that is used to hold food during dielectric heating must be a nonconductor of electricity. Also, the receptacle must be made of a material that absorbs energy more slowly than the food during dielectric heating, so that the receptacle is not charred or otherwise damaged while the food is being heated to the desired temperature. Finally, the receptacle should be inexpensive and durable so that it can be used economically in the mass production operations of freezing and storing which usually precede the dielectric heating operation.

The receptacles heretofore known which most nearly meet these requirements are receptacles made of cellular polystyrene. Such receptacles are commonly used to hold individual servings of food which are to be frozen, stored, and subsequently reheated in dielectric ovens in preparation for serving.

However, it has been found that the receptacles of cellular polystyrene that are commonly used to hold food during dielectric heating are subject to certain serious disadvantages. In general these disadvantages arise from the fact that polystyrene is a fusible material. It has been found that the length of time during which food in a receptacle of cellular polystyrene can be exposed to dielectric heating is strictly limited, because if such a receptacle becomes too hot the polystyrene begins to fuse so that the receptacle becomes warped and distorted. Even when the time of heating is carefully limited, it has been found that a receptacle of cellular polystyrene will sometimes develop a leak during dielectric heating. The food which is contained in the receptacle is not uniform in texture, so that during dielectric heating some parts of the food absorb energy more rapidly and are heated faster than other parts of the food. In this way, a "hot spot" may develop in the food which will melt a hole in the cellular polystyrene receptacle before all of the food in the receptacle has been heated to the desired temperature. Also the food may contain grease which attacks and weakens the cellular polystyrene receptacle so as to cause a hole to develop during dielectric heating.

SUMMARY OF THE INVENTION

The principal object of the invention is to provide a novel receptacle which can be used to hold food during dielectric heating, and which is superior to the receptacles heretofore used for such purpose in that it is not subject to damage during such use. More specific objects and advantages are apparent from the following description, which is intended to disclose and illustrate the invention but not to limit its scope.

It is known that a cellulose-filled thermoset aminoplast is infusible, and a cellulose-filled thermoset aminoplast of the melamine-formaldeyde type is commonly used in making dinnerware for household use. However, a cellulose-filled thermoset aminoplast also is known to absorb energy rapidly when exposed to dielectric heating. Thus when a receptacle of ordinary melamine-formaldehyde dinnerware is filled with food and is subjected to dielectric heating, the receptacle, which is made of a cellulose-filled thermoset aminoplast of the melamine-formaldehyde type, is heated more rapidly than the food and becomes blistered before the food is warm enough to serve.

According to the commercial standard for melamine dinnerware (alpha-cellulose-filled) for household use, published by the U.S. Department of Commerce, the minimum thickness of a bowl having a capacity of 12 ounces or more is 0.100 inch; the minimum thickness of a bowl having a capacity of less thna 8 ounces is .080 inch; and the minimum thickness of a bowl of intermediate capacity is .095 inch.

Such a bowl, made of a cellulose-filled thermoset melamine-formaldehyde reaction product, will blister severely if used to hold food during dielectric heating. Thus it has been believed heretofore that a receptacle made of a cellulose-filled thermoset aminoplast, because it absorbs energy rapidly when exposed to dielectric heating, is not suitable for holding food during a dielectric heating operation.

A receptable embodying the present invention is unique in that it is in the form of a thin shell, substantially thinner than an ordinary dinnerware receptacle. A receptacle embodying the present invention is made of a celluose-filled thermoset aminoplast, which is a material that absorbs energy rapidly when exposed to dielectric heating. Thus when a receptacle embodying the present invention is tested by exposing it in a dielectric oven, it is charred in about 25 seconds.

The present invention is based upon the discovery that, although an empty receptacle embodying the present invention is charred by about 25 seconds of exposure in a dielectric oven, the present receptacle gives excellent results when exposed in a dielectric oven for as long as from one to two minutes if it is used to hold food. It has been discovered that when the present receptacle is of a certain critical thickness, from .015 to .05 inch, food contained in the receptacle will conduct heat away from the receptacle rapidly enough to prevent the receptacle from being charred or otherwise damaged during a dielectric heating period of one to two minutes, which is adequate for heating food to the proper temperature for serving. It has been discovered further that although the critical thickness which is necessary to produce satisfactory results is substantially less than the thickness of an ordinary dinneware receptacle, such critical thickness is still sufficient so that the receptacle has adequate strength and durability for a single use, as a disposable receptacle.

Finally, it has been discovered that the present receptacle, when used as a disposable receptacle for holding food during dielectric heating and for subsequent serving of the food, is so superior to a cellular polystyrene receptacle, which is the best receptacle heretofore known for such use, that the relatively high cost of the present receptacle is economically justifiable.

The present receptacle is superior to a cellular polystyrene receptacle in that the present receptacle is sufficiently durable so that it never develops leaks when used to hold food during a dielectric heating period of from one to two minutes, even though the present receptacle is thin enough so that loss of heat from the receptacle to the food will prevent the receptacle from being charred during such a dielectric heating period.

BRIEF DESCRIPTION OF THE DRAWING

FIG. 1 of the drawing is plan view of a receptacle embodying the present invention.

FIG. 2 is a vertical section on the line 2—2 of FIG. 1.

FIG. 3 is a plan view of another form of receptacle embodying the present invention.

FIG. 4 is an end elevation of the receptacle shown in FIG. 3.

DESCRIPTION OF THE PREFERRED EMBODIMENTS

The drawing shows two typical receptacles embodying the present invention. The receptacles of the present invention may be molded from any commercial cellulose-filled melamine-formaldehyde molding composition, of the type used for producing dinneware. If desired, a cellulose-fillel diguanamine-formaldehyde composiiton or urea-formaldehyde composition may be used in place of a cellulose-filled melamine-formaldehdye composition. However, a cellulose-filled urea-formaldehyde composition produces a less durable receptacle which is more suitable for use in the mess hall of an institution rather than in a fine restaurant.

For best results, a receptacle produced from a cellulose-filled aminoplast molding composition should have a wall thickness from .025 to .035 inch, although in some cases the wall thickness may be as little as .020 inch.

A receptacle embodying the present invention having somewhat greater strength may be produced by impregnating sheets of paper with an aminoplast and hot pressing, and the wall thickness of such as receptacle may be as little as .015 inch.

The receptacle shown in the drawing, when molded from a cellulose-filled melamine-formaldehyde molding composition, preferably have a wall thickness of about .025 inch. The receptacle shown in FIG. 1, when made with a length of 8 inches and a width of 5 inches, has a capacity of 16 fluid ounces. A typical receptacle of the type shown in FIG. 3 has a capacity of 17 fluid ounces.

Although the flange 10 on the receptacle shown in FIGS. 3 and 4 is not in contact with the food, it will not char during the dielectric heating operation if it is only about ⅛ inch wide and only about .025 inch thick.

A receptacle embodying the invention preferably is in the form of a bowl or a deep dish as shown in the drawing.

In the practice of the present invention, a receptacle embodying the present invention is substantially filled with food and is then exposed to a dielectric heating operation which would char the receptacle if empty. Because of the critical wall thickness of the receptacle, the food conducts the heat away from the receptacle rapidly enough during the dielectric heating operation so as to prevent the receptacle from becoming charred or blistered.

Ordinarily after the food is placed in the present receptacle, the food is frozen to permit the receptacle containing the food to be held and stored until needed. When the food is to be prepared for serving, the receptacle containing the frozen food is placed in a dielectric heating oven. When the receptacle is placed in the oven, it is often advantageous to cover the receptacle loosely with wax paper or with a paper plate to retard the escape of steam or heat from the food. After the food has been exposed to the dielectric heating for 1 minute to thaw the frozen food, it is desirable to permit the thawed food to stand without heating for at least one minute to complete the melting of all ice crystals. The food in the receptacle is then exposed again to dielectric heating for a period of one to two minutes until the food has been heated to the desired temperature for serving. If necessary, the receptacle containing the food can be kept hot in an ordinary oven for as long as one hour at 350° F. without damaging the receptacle.

A receptacle embodying the present invention is superior to a cellular polystyrene receptacle of the type commonly used to hold food during dielectric heating, in that the present receptacle is not damaged in any way when so used, whereas a cellular polystyrene receptacle frequently becomes warped or develops a leak during dielectric heating.

A disposable receptacle for dielectric heating of food, embodying the present invention, consists essentially of a cellulose-filled thermoset aminoplast, and has a wall thickness from .015 to .05 inch.

The present receptacle preferably is produced by hot pressing from a commercial cellulose-filled melamine-formaldehyde molding composition.

Such a molding composition ordinarily is prepared by reacting melamine and formaldehyde in aqueous solution at reflux temperature and at a pH of about 8 to 9, in a molar formaldehyde-melamine ratio between 2:1 and 2.5:1, usually from 2.0:1 to 2.2:1. The reaction is continued to obtain a solution which is sufficiently stable at ordinary temperatures so that it can be used to impregnate bleached sulfite pulp. The impregnated pulp, which consists of from about 65% to 75% by weight of melamine-formaldehyde reaction product and from about 25% to 35% of cellulose, is dried and ground to a fine powder. During the grinding, various modifiers such as pigments, zinc stearate or other lubricants and phthalic anhydride or other acidic materials are incorporated.

Although the preferred reactants for use in preparing the cellulose-filled aminoplast are melamine and formaldehyde, other amino triazines and other aldehydes such as those listed in U.S. Pat. No. 2,841,571 may be employed in place of melamine and formaldehyde. An example of a modified melamine-formaldehyde molding composition is the benzoguanamine-melamine-formaldehyde molding composition described in U.S. Pat. No. 2,579,985.

One amino triazine which may be used in place of melamine is gamma-methyl-gamma-acetylpimeloguanamine. Another amino triazine which may be used in place of melamine to produce an aminoplast for use in the practice of the present invention is 2-methyl glutaroguanamine.

In the production of a receptacle embodying the present invention from such a molding composition, the molding composition, usually in the form of a preheated preform, is placed in a mold having a cavity corresponding to the desired configuration of the receptacle, the mold being at a temperature of about 320° F. The mold is then closed and the molding composition is held in the mold under a pressure of 1 to 2 tons per square inch for about two minutes. The two halves of the mold are then separated, and the finished receptacle is ejected from the mold.

A receptacle embodying the present invention also may be molded from a commercial urea-formaldehyde molding composition by conventional molding procedure.

Another process which may be used for making a receptacle embodying the present invention is a pulp molding process. In such a process, shredded bleached sulfite pulp, instead of being impregnated with the aminoplast solution, is formed into a slurry with an excess of the aminoplast solution. A metallic screen is formed into the approximate shape of the receptacle, and the slurry is applied in a thin layer upon the convex side of the screen while a vacuum is applied to the other side of the screen. The degree of vacuum should be sufficient to leave the cellulose fibers impregnated with 1½ to twice their weight of the aminoplast solids. The impregnated celluose fibers on the screen may then be dried so that the resulting preform can be removed from the screen and subjected to heat and pressure in order to mold the receptacle.

In another method of producing a receptacle embodying the present invention, an aqueous solution of an aminoplast, having a solids content of about 50% by weight, is used to impregnate sheets of paper. Preferably the paper consists of alpha cellulose fiber, or consists of a mixture of approximately equal weights of alpha cellulose fiber and rayon fiber. After the paper has been impregnated and dried, it should have an aminoplast content of about 45 to 70% by weight.

Sheets of the dry impregnated paper, in sufficient number to produce a receptacle of the desired thickness, are then pressed together at about 300° F. for about 2 minutes and under a pressure of 1 to 2 tons per square inch between dies that are shaped to produce a receptacle of the desired configuration. This procedure consisting in hot-pressing sheets of impregnated paper, produces receptacles of the greatest physical strength, and a receptacle produced by this method may have a thickness as little as .015 inch.

In all methods of producing receptacles of the present invention, the aqueous aminoplast solution may be brought to a pH of about 6 to 7 before it is used to impregnate the cellulosic material in order to expedite curing of the aminoplast to its infusible state during the hot pressing operation.

The crux of the present invention is the critical thickness of the receptacle. It has been found that the critical thickness of the present receptacle permits the food to conduct heat away from the receptacle rapidly enough to prevent charring of the receptacle during the dielectric heating operation.

Because of the critical thickness of the present receptacle, however, the present receptacle is definitely substandard in strength as compared with ordinary cellulose-filled melamine-formaldehyde dinnerware. On the other hand, a dinnerware receptacle of ordinary thickness, made of the same material as the present receptacle, could not be used in the dielectric heating of food because it would blister before its contents had become warm.

Because of the critical thickness of the present receptacle, its strength and durability are so low that it can be used only once, and must be considered a disposable receptacle.

Ordinarily, a cellulose-filled aminoplast would not be considered to be a suitable material for making a disposable receptacle because of its high cost. The utility of the present disposable receptacle is a special utility for the dielectric heating of food. When used for that purpose, the present disposable receptacle is of great value because it does not warp or develop leaks when used to hold food during dielectric heating.

I claim:

1. A method of preparing food comprising the steps of substantially filling with food a receptacle consisting essentially of a cellulose-filled thermoset aminoplast and having a wall thickness from .015 to .05 inch, and exposing it to dielectric heating which would char the receptacle if empty.

2. A method according to claim 1 wherein the aminoplast is a melamine-formaldehyde reaction product.

3. A method according to claim 1 wherein the food is first frozen in the receptacle.

4. A disposable receptacle for dielectric heating of food, consisting essentially of a cellulose-filled thermoset aminoplast, and having a wall thickness from .015 to .05 inch.

5. A disposable receptacle according to claim 4 wherein the aminoplast is a melamine-formaldehyde reaction product.

6. A disposable receptacle according to claim 5 wherein the wall thickness is from .025 to .035 inch.

References Cited
UNITED STATES PATENTS

| | | | |
|---|---|---|---|
| 2,579,985 | 12/1951 | Varela | 260—67.6 |
| 2,841,571 | 7/1958 | Wohnsiedler | 260—67.6 |
| 3,271,169 | 9/1966 | Baker et al. | 99—1X |
| 3,353,968 | 11/1967 | Krajewski | 99—1UX |

FRANK W. LUTTER, Primary Examiner

W. L. MENTLIK, Assistant Examiner

U.S. Cl. X.R.

99—171; 229—3.5